(12) United States Patent
Agopian et al.

(10) Patent No.: US 8,599,201 B1
(45) Date of Patent: Dec. 3, 2013

(54) SYSTEM AND METHOD FOR A STENCIL-BASED OVERDRAW VISUALIZER

(71) Applicant: Google Inc., Mountain View, CA (US)

(72) Inventors: Mathias Agopian, Mountain View, CA (US); Romain Guy, Mountain View, CA (US); Jamie Gennis, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/754,478

(22) Filed: Jan. 30, 2013

Related U.S. Application Data

(60) Provisional application No. 61/719,890, filed on Oct. 29, 2012.

(51) Int. Cl.
*G06T 15/40* (2011.01)
*G06T 1/00* (2006.01)
*G06T 1/60* (2006.01)

(52) U.S. Cl.
USPC ..................... 345/422; 345/501; 345/530

(58) Field of Classification Search
USPC ........................... 345/422, 501, 530
See application file for complete search history.

(56) References Cited

U.S. PATENT DOCUMENTS

| | | | |
|---|---|---|---|
| 6,801,215 B1* | 10/2004 | Silva et al. | 345/629 |
| 2006/0098021 A1* | 5/2006 | Rim et al. | 345/543 |
| 2010/0328321 A1* | 12/2010 | Cormack et al. | 345/501 |

* cited by examiner

*Primary Examiner* — Joni Richer
(74) *Attorney, Agent, or Firm* — McDonnell Boehnen Hulbert & Berghoff LLP

(57) ABSTRACT

Systems and methods for a stencil-based overdraw visualizer are described. Mobile device that includes, for example, one or more memories and one or more processors operatively coupled to the one or more memories. The one or more memories include a stencil buffer. The one or more processors are configured to render graphics on a display based on an application that is running on the one or more processors; count overdraws in the stencil buffer on a pixel-by-pixel basis; associate respective colors with corresponding overdraw values stored in the stencil buffer; and combine rendered graphics on the display based on the application with the colors indicated in the stencil buffer on a pixel-by-pixel basis.

20 Claims, 4 Drawing Sheets

US 8,599,201 B1

SYSTEM AND METHOD FOR A STENCIL-BASED OVERDRAW VISUALIZER

CROSS-REFERENCE TO RELATED APPLICATIONS/INCORPORATION BY REFERENCE

This patent application makes reference to, claims priority to and claims benefit from U.S. Provisional Application Ser. No. 61/719,890 filed on Oct. 29, 2012. The above stated application is hereby incorporated herein by reference in its entirety.

BACKGROUND

Mobile devices have limited memory bandwidth, which can cause difficulties in view of increasingly denser displays. As the number of pixels in a display increase, the memory bandwidth used to draw the entire screen also increases. Performance issues can arise when an application draws on the same part of the screen multiple times in a single frame (i.e., overdraw).

For example, if a mobile device can only sustain an application drawing the screen three times per frame at sixty frames per second and the application draws the screen four times per frame, then the animations will not be smooth.

In addition, operations might be wasteful since subsequent drawings in the area of the display can entirely cover earlier drawings in the same frame. Thus, although earlier resources were used in a frame, there might not be a visual effect based on those earlier used resources because the visual effect is covered up by later visual effects in the same frame.

Further limitations and disadvantages of conventional and traditional approaches will become apparent to one of skill in the art through the comparison of such systems with some aspects of some embodiments according to the present disclosure as set forth in the remainder of the present application with reference to the drawings.

BRIEF SUMMARY

Aspects of the disclosure relate to methods and systems for a stencil-based overdraw visualizer.

An example embodiment provides a computing device that includes, for example, one or more memories and one or more processors operatively coupled to the one or more memories. The one or more memories include at least one stencil buffer. The one or more processors are configured to render graphics on a display based on an application that is being executed on the one or more processors; count overdraws as overdraw values stored in the least one stencil buffer; associate respective colors with corresponding overdraw values stored in the least one stencil buffer; and combine rendered graphics on the display based on the application with the colors indicated in the least one stencil buffer.

An example embodiment provides a method including, for example, one or more of the following: rendering graphics on a display of a computing device based on an application that is being executed on one or more processors of the computing device; counting overdraws on a pixel-by-pixel basis as overdraw values stored in at least one stencil buffer residing in one or more memories of the computing device, the one or more memories being operatively coupled to the one or more processors; associating respective colors with corresponding overdraw values stored in the least one stencil buffer; and combining, for each frame, rendered graphics on the display, based on an application running on the one or more processors, with the colors indicated in the least one stencil buffer on a pixel-by-pixel basis.

An example embodiment provides a cellular phone that includes, for example, one or more memories and one or more processors operatively coupled to the one or more memories. The one or more memories include at least one buffer. The one or more processors include a graphics accelerator in which the graphics accelerator is configured to render graphics on a display based on an application that is being executed on the one or more processors; count overdraws as overdraw values stored in the least one buffer; use color coding with corresponding overdraw values stored in the least one buffer; and combine, for each frame, rendered graphics on the display based on the application with the colors indicated in the least one buffer.

These and other advantages, aspects and novel features of the present disclosure, as well as details of an illustrated embodiment thereof, will be more fully understood from the following description and drawings.

DETAILED DESCRIPTION

Aspects of the disclosure relate to methods and systems for a stencil-based overdraw visualizer.

Performance issues arise when an application draws a part of a screen more time than can be supported by a wireless communication device. To identify and to correct such performance issues, systems and methods are developed to determine where and to what extent overdraw occurs during the operation of an application.

In an example embodiment, a tool is developed to visualize what parts of the screen of the wireless communication device are drawn multiple times and the number of times the overdrawing occurs on different parts of the screen.

In an example embodiment, the tool provides a visualization of the overdrawing of the screen by the application. Each pixel is rendered, at least in part, with a color that indicates the number of times that the pixel was drawn, for example, during a frame. In an example embodiment, blue color can indicate that the pixel was drawn once during the frame; green color can indicate that the pixel was drawn twice during the frame; and red color can indicate that the pixel was drawn three times during the frame, and so on. By observing the screen as the application operates, a developer can determine if the application is overdrawing in a part of the screen at one time or another and can correct performance issues by correcting the occurrence of excessive overdrawing on the screen during the operation of the application.

Figure 1:
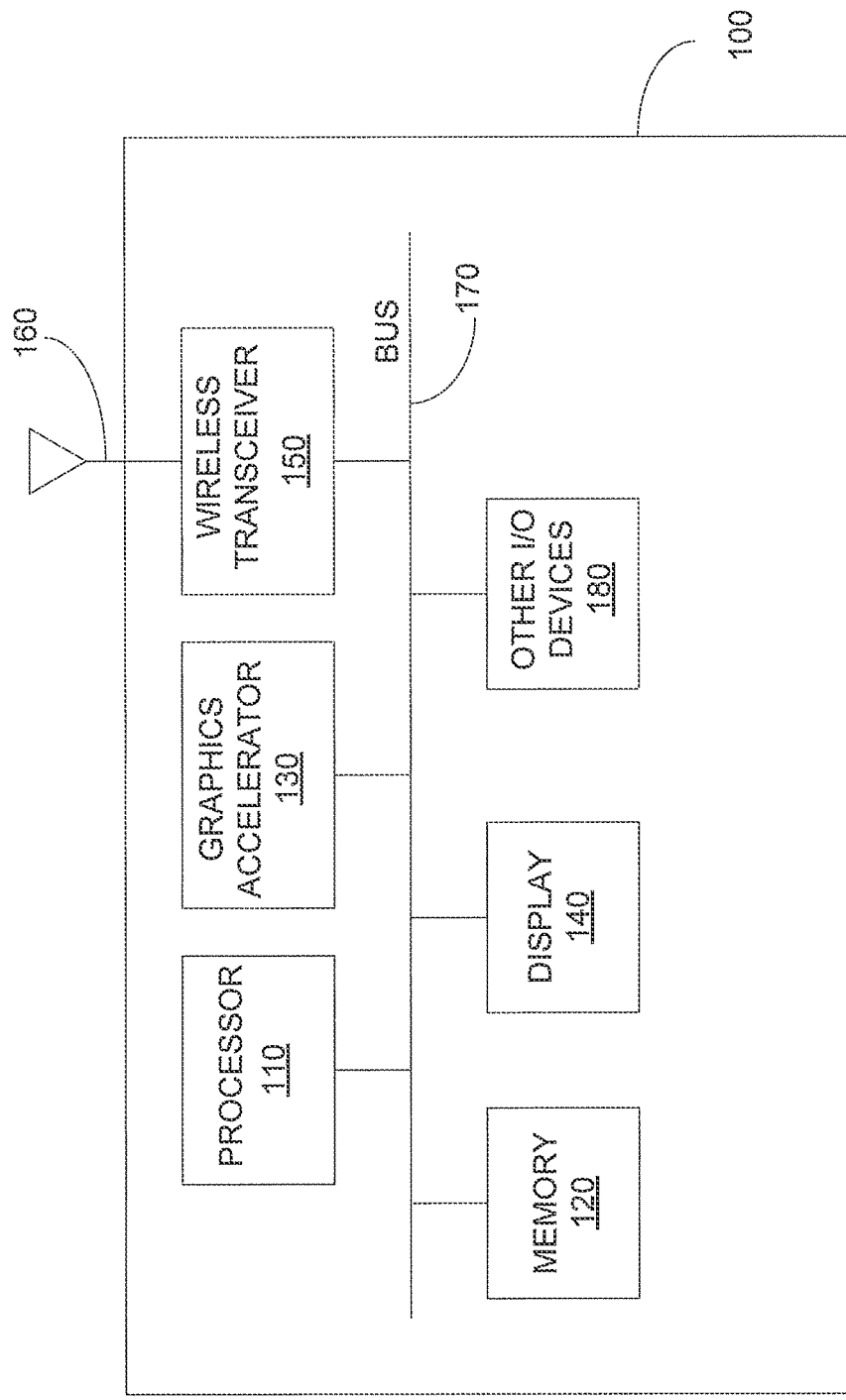
FIG. 1 shows an example embodiment of a wireless communication device.

FIG. 1 shows an example embodiment of a wireless communication device 100. The wireless communication device 100 can include or can be, for example, one or more of the following: a mobile cellular phone, a smart phone, a computing tablet, a laptop computer, a computer, a cellular device, a personal digital assistant (PDA), a portable computing device, etc.

Referring to FIG. 1, one or more processors 110, one or more memories 120, a graphics accelerator 130 (e.g., a hardware graphics accelerator), a display 140, one or more wireless transceivers 150 and one or more other input/output (I/O) devices are coupled to one or more buses 170. One or more antennas 160 are coupled to the bus 170 via the wireless transceiver 150.

The memory 120 can include, for example, RAM, ROM, flash memory, a memory card, nonvolatile memory, non-transitory computer readable media, cache, buffers, etc.

The processor 110 and the graphics accelerator 130 can be configured to operate with the memory 120 to implement hardware, instructions, code, firmware and/or software that is run, performed or executed by the processor 110 and/or the graphics accelerator 130. The instructions, code, firmware and/or software can be stored in the memory 120 and/or an internal memory (e.g., a cache) of the processor 110.

In operation, an operating system and an application are stored in the memory 120 and/or an internal memory (e.g., a cache) of the processor 110. The operating system runs on the processor 110. The application, which also runs on the processor, can also use the graphics accelerator 130 to draw on the display 140 that includes pixels, for example.

When the application uses the graphics accelerator 130 to draw on the display 140, the operating system can rely on, for example, Open Graphics Library (OpenGL), which is a cross-language, multi-platform application programming interface (API), to draw the application on the display 140. OpenGL is used to interact with the graphics accelerator 130 to achieve hardware-accelerated computer graphics.

OpenGL offers access to a special graphics buffer called the stencil buffer. The stencil buffer can be formed in one or more of the following: the memory 120, the internal memory of the processor 110, and an internal memory of the graphics accelerator 130. The stencil buffer can be cleared, drawn into or used as a mask for testing. For example, if a circle is drawn in the stencil buffer and if the stencil buffer is used as a mask to draw rectangle on the display 140, then the rectangle is clipped by the content of the stencil buffer resulting in a circle.

OpenGL lets an application define what happens whenever a value is written in the stencil buffer. For example, if the application draws a single pixel in the stencil buffer at (0,0) and if the stencil buffer already has a value at (0,0), then the application can specify one or more of the following: to replace the existing value with a new value; to keep the existing value and discard the new value; to increment the existing value by a fixed amount, etc.

In an example embodiment, the stencil buffer is used to count the number of times that each pixel of the display 140 is drawn.

In operation, the application with the use of the graphics accelerator 130 renders frames of graphics on the display 140. The graphics accelerator 130 uses the stencil buffer to keep track of any overdraw on a pixel-by-pixel basis of a particular frame of graphics. The values in the stencil buffer are color coded and combined (e.g., a weighted average) with some transparency with the graphics rendered by the application on a pixel-by-pixel basis. The combination of the color overlay based on the values of the stencil buffer and the graphics rendered by the application for each frame provide a visualization of which parts of the display 140 are being overdrawn, perhaps to the detriment of visual performance. The combined graphics can be shown in real-time in an example embodiment during normal operation of the application over a plurality of frames. Based on the stencil-based overdraw visualization, the application can be redesigned, reprogrammed or reconfigured so that, with respect to particular portions of the display, overdraw can be reduced or eliminated.

Figure 2:
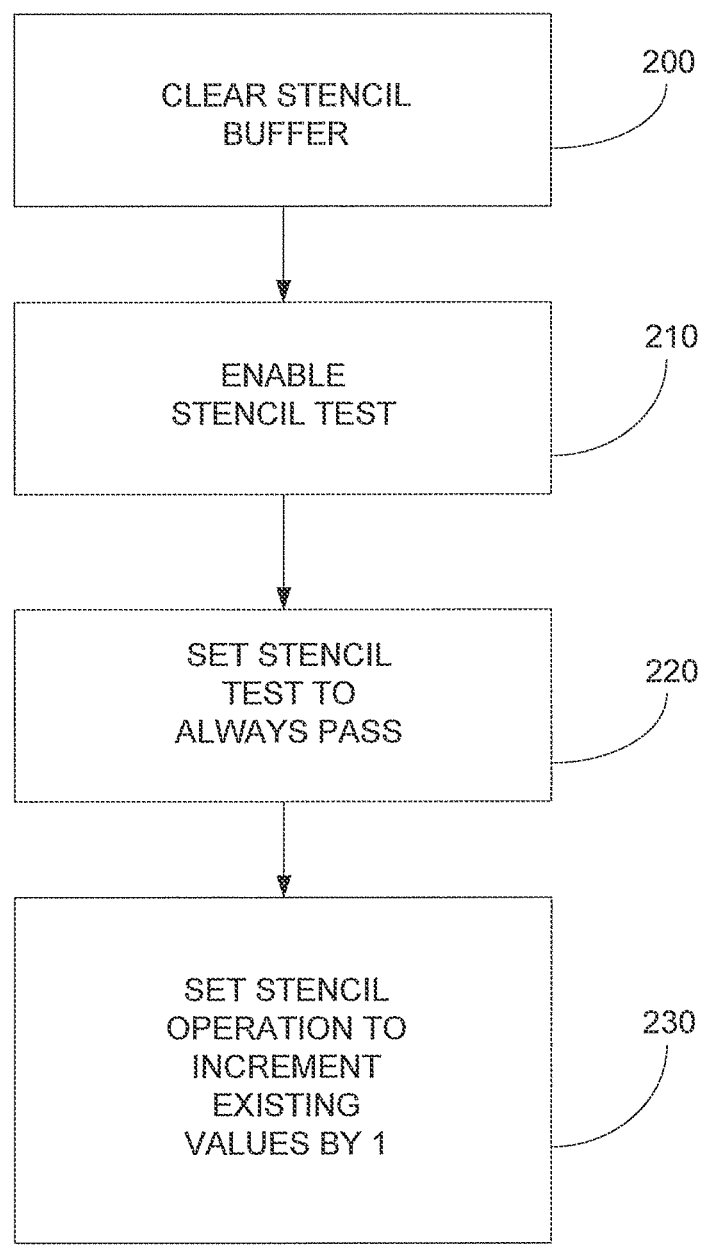
FIG. 2 is a flow chart of a method for using a stencil buffer at the beginning of a new frame according to an example embodiment.
Figure 3:
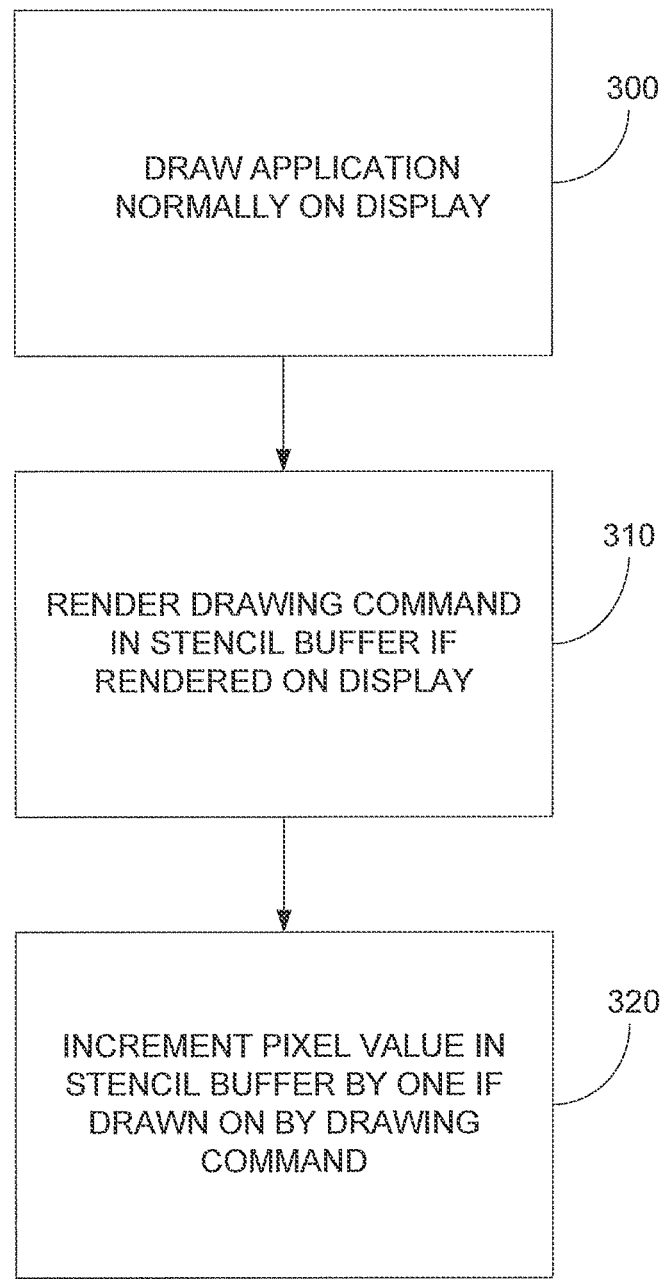
FIG. 3 is a flow chart of a method using the stencil buffer during the new frame according to an example embodiment.
Figure 4:
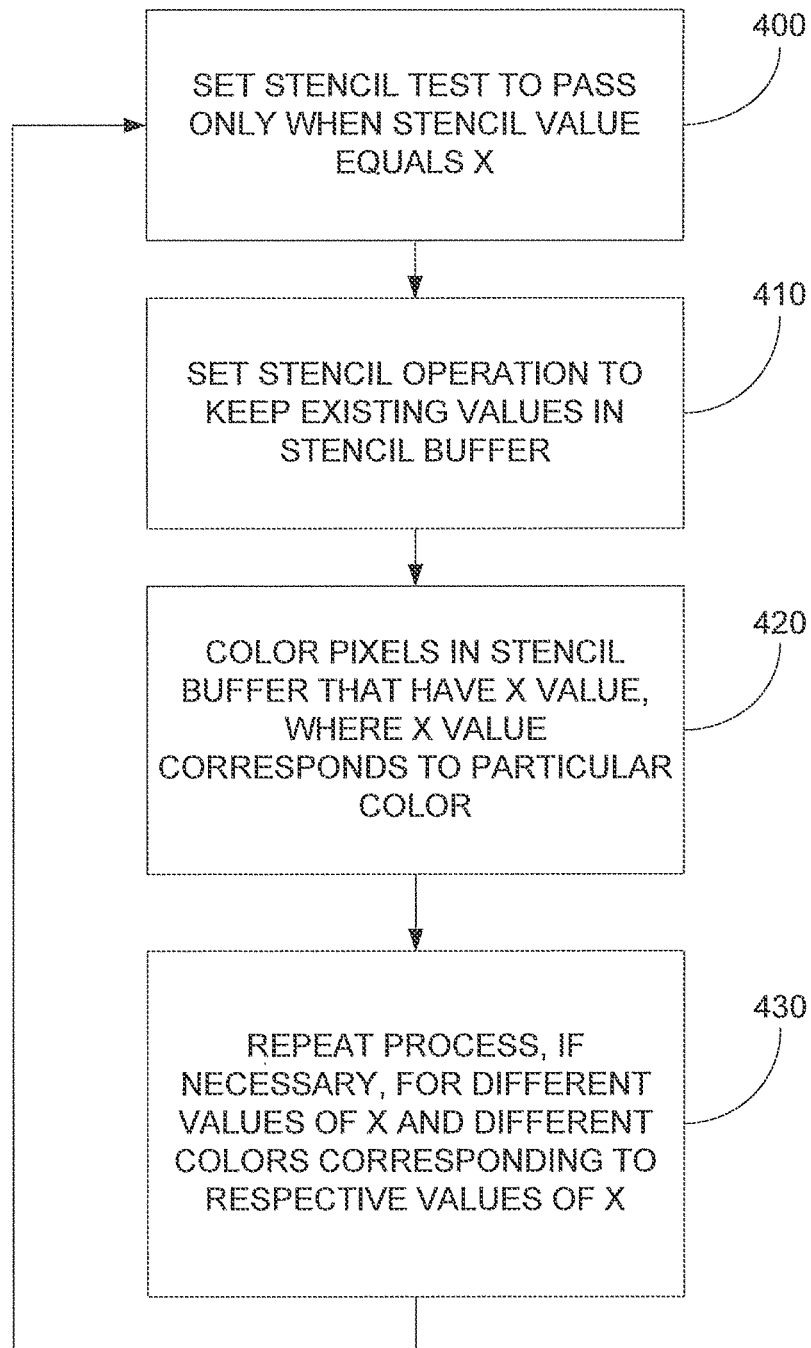
FIG. 4 is a flow chart of a method using the stencil buffer at the end of a frame according to an example embodiment.

FIGS. 2-4 illustrate an example embodiment of a method for using a stencil buffer to provide stencil-based overdraw visualization during a frame that is rendered by the application on the display 140.

FIG. 2 is a flow chart of a method for using a stencil buffer at the beginning of a new frame according to an example embodiment. In step 200, the stencil buffer is cleared. In an example embodiment, each pixel of the stencil buffer is set to a value of zero. In step 210, the stencil test is enabled. In step 220, the stencil test is set to always pass. In step 230, the stencil operation is set to increase an existing value by one.

FIG. 3 is a flow chart of a method using the stencil buffer during the new frame according to an example embodiment. In step 300, the application is drawn normally on the display 140 using the graphics accelerator 130. In step 310, if drawing command sent by the application is rendered on the display 140, then the drawing command is rendered into the stencil buffer. In an example embodiment, in step 320, each pixel touched (e.g., drawn on) by the drawing command in the stencil buffer increments the content value of the stencil buffer at the respective pixel by one. Accordingly, each pixel in the stencil buffer has a value that is indicative of the number of times that the respective pixel is being drawn on in a frame.

FIG. 4 is a flow chart of a method using the stencil buffer at the end of a frame according to an example embodiment. In step 400, in an example embodiment, the stencil test is set to pass only when the stencil value equals X, where X is the number of overdraws to be highlighted. In an example embodiment, the stencil test can be set to pass when the stencil value is equal to or less than X. In step 410, the stencil operation is set to keep the existing values in the stencil buffer so that the stencil buffer is not modified by subsequent drawing operations. In step 420, graphics are drawn over the display with the desired color. In step 430, the process is repeated, if necessary, for different values of X and the respective colors corresponding to the different values of X to show visually the different amounts of overdraws.

In an example embodiment, the operations in FIGS. 2-4 provide an overlay of colors on a pixel-by-pixel basis over the graphics normally rendered by the application in a frame on the display 140. The different colors represent the number of times that a particular pixel has been overdrawn during the frame.

The color overlay is somewhat transparent so that the underlying application graphics are easily visible on the display 140. In an example embodiment, the display on each pixel can be a weighted average between the color overlay indicating the number of overdraws and the application graphics that are normally rendered on the display 140. The weighted average can be designed so improve the visualization. Thus, in an example embodiment, the graphics of the application can be viewed normally on the display 140 in which the pixels are tinged with an overlay of color (e.g., due to a weighted average between the overlay color and the rendered graphics of the application) indicating the parts of the display 140 that suffer from overdraw.

By visualizing the overdraw, the application can be redesigned or reconfigured so that overdraw on parts of the display 140 can be reduced or avoided. The reconfiguring can be accomplished automatically or manually.

In an example embodiment, overdraws are not counted on a pixel-by-pixel basis. The overdraws can be counted in other ways including, for example, counting for groups of pixels. In another example embodiment, overdraws are count for some pixels, but not for other pixels.

In an example embodiment, the graphics accelerator 130 measures the amount of overdraw, for example, for each pixel of the display 140 or for each pixel rendered by the application.

In an example embodiment, the processor 110 can be configured to use processor measurements based on intersecting bounding boxes for each drawing command. This might be expensive under some circumstances and might cover pixels that are not actually rendered.

In an example embodiment, the graphics accelerator 130 can be used with a different buffer, for example, a depth buffer using a technique called "depth peeling." In such a technique, unlike the stencil buffer approach described above, each drawing command has a position on the Z-axis, for example, in 3-dimensional space.

Methods and systems for a stencil-based overdraw visualizer are described. An application, with the aid of a graphics accelerator, renders frames of graphics on a display. The graphics accelerator uses a stencil buffer to keep track of any overdraw on a pixel-by-pixel basis of a particular frame of graphics. The values in the stencil buffer are color coded and combined with the graphics rendered by the application on a pixel-by-pixel basis for each frame. The combination of the color overlay based on the values of the stencil buffer and the graphics rendered by the application for each frame provide a visualization of which parts of the display are being overdrawn. Based on the stencil-based overdraw visualization, the application can be redesigned, reprogrammed or reconfigured so that, with respect to particular parts of the display, overdraw can be reduced or eliminated.

While the present method and apparatus has been described with reference to certain embodiments, it will be understood by those skilled in the art that various changes may be made and equivalents may be substituted without departing from the scope of the present method and apparatus. In addition, many modifications may be made to adapt a particular situation or material to the teachings of the present disclosure without departing from its scope. Therefore, it is intended that the present method and apparatus not be limited to the particular embodiment disclosed, but that the present method and apparatus will include all embodiments falling within the scope of the appended claims.

What is claimed is:

1. A computing device, comprising:
   one or more memories including at least one stencil buffer; and
   one or more processors operatively coupled to the one or more memories, wherein the one or more processors are configured to:
   execute an application that renders graphics on a display;
   determine overdraw values for a plurality of portions of the display, wherein the overdraw values are stored in the at least one stencil buffer and wherein a given overdraw value represents a number of times that a value is written to the at least one stencil buffer corresponding to one of the portions of the display while rendering graphics on the display;
   associate respective colors with corresponding overdraw values stored in the at least one stencil buffer; and
   combine rendered graphics on the display based on the application with an overlay of the colors indicated in the at least one stencil buffer.

2. The device according to claim 1, wherein the rendered graphics on the display and the overlay of the colors indicated in the at least one stencil buffer are combined according to a weighted average on a pixel-by-pixel basis.

3. The device according to claim 1, wherein the rendered graphics on the display and the overlay of the colors indicated in the at least one stencil buffer are combined for each frame of rendered graphics.

4. The device according to claim 1, wherein the one or more processors include a graphics accelerator.

5. The device according to claim 4, wherein the application uses an application programming interface (API) with the graphics accelerator.

6. The device according to claim 1, wherein the combined rendered graphics and the overlay of the colors indicated in the at least one stencil buffer provide a visualization of overdraw in a frame of the display.

7. The device according to claim 6, wherein the application can be reconfigured based on the visualization of the overdraw over a plurality of frames of the display.

8. The device according to claim 1, wherein the combined rendered graphics and the overlay of the colors indicated in the at least one stencil buffer provide a visualization of overdraw in a part of the display that is degrading graphics performance.

9. The device according to claim 1, wherein the rendered graphics and the overlay of the colors indicated in the at least one stencil buffer are combined to provide a real-time display during normal operation of the application.

10. A method, comprising:
    executing an application that renders graphics on a display of a computing device;
    determining overdraw values for a plurality of portions of the display, wherein the overdraw values are stored in at least one stencil buffer residing in one or more memories of the computing device, the one or more memories being operatively coupled to one or more processors, and wherein a given overdraw value represents a number of times that a value is written to the at least one stencil buffer corresponding to one of the portions of the display while rendering graphics on the display;
    associating respective colors with corresponding overdraw values stored in the at least one stencil buffer; and
    combining, for each frame, rendered graphics on the display based on the application with an overlay of the colors indicated in the at least one stencil buffer on a pixel-by-pixel basis.

11. The method according to claim 10, wherein the rendered graphics on the display and the overlay of the colors indicated in the at least one stencil buffer are combined according to a weighted average on a pixel-by-pixel basis.

12. The method according to claim 10, wherein the one or more processors include a graphics accelerator.

13. The method according to claim 12, wherein the application uses an application programming interface (API) with the graphics accelerator.

14. The method according to claim 10, wherein the combined rendered graphics and the overlay of the colors indicated in the at least one stencil buffer provide a visualization of overdraw in a frame of the display.

15. The method according to claim 14, wherein the application can be reconfigured based on the visualization of the overdraw over a plurality of frames of the display.

16. The method according to claim 10, wherein the rendered graphics and the overlay of the colors indicated in the at least one stencil buffer are combined to provide a real-time display during normal operation of the application.

17. A cellular phone, comprising:
one or more memories including at least one buffer; and
one or more processors operatively coupled to the one or more memories, wherein the one or more processors include a graphics accelerator, wherein the graphics accelerator is configured to:
render graphics on a display based on an application that is being executed on the one or more processors;
determine overdraw values for a plurality of portions of the display, wherein the overdraw values are stored in the at least one buffer and wherein a given overdraw value represents a number of times that a value is written to the at least one buffer corresponding to one of the portions of the display while rendering graphics on the display;
associate respective colors with corresponding overdraw values stored in the at least one buffer; and
combine, for each frame, rendered graphics on the display based on the application with an overlay of the colors indicated in the at least one buffer.

18. The phone according to claim 17, wherein the rendered graphics on the display and the overlay of the colors indicated in the at least one buffer are combined according to a weighted average.

19. The phone according to claim 17, wherein the rendered graphics and the overlay of the colors indicated in the at least one buffer are combined to provide a real-time display during normal operation of the application.

20. The phone according to claim 19, wherein the application can be reconfigured based on the visualization of the overdraw over a plurality of frames of the display.

* * * * *